US012600558B2

(12) United States Patent
Lechner

(10) Patent No.: US 12,600,558 B2
(45) Date of Patent: Apr. 14, 2026

(54) AEROSOL CAN CONFIGURATION

(71) Applicant: Roland Lechner, Singen (DE)

(72) Inventor: Roland Lechner, Singen (DE)

( * ) Notice: Subject to any disclaimer, the term of this patent is extended or adjusted under 35 U.S.C. 154(b) by 91 days.

(21) Appl. No.: 17/517,912

(22) Filed: Nov. 3, 2021

(65) Prior Publication Data

US 2022/0055821 A1 Feb. 24, 2022

Related U.S. Application Data

(62) Division of application No. 16/268,680, filed on Feb. 6, 2019, now Pat. No. 11,220,393.

(30) Foreign Application Priority Data

Feb. 16, 2018 (DE) ..................... 10 2018 001 221.3

(51) Int. Cl.

| | |
|---|---|
| ***C08J 9/14*** | (2006.01) |
| ***B29B 7/74*** | (2006.01) |
| ***B65D 83/28*** | (2006.01) |
| ***B65D 83/68*** | (2006.01) |
| ***B65D 83/682*** | (2025.01) |
| ***C08G 18/48*** | (2006.01) |
| ***C08G 18/76*** | (2006.01) |
| ***C08J 9/00*** | (2006.01) |
| ***C08L 75/04*** | (2006.01) |

(52) U.S. Cl.

CPC ................ *B65D 83/68* (2013.01); *B29B 7/74* (2013.01); *B29B 7/7404* (2013.01); *B29B 7/7428* (2013.01); *B65D 83/28* (2013.01); *B65D 83/682* (2013.01); *C08G 18/4804* (2013.01); *C08G 18/7671* (2013.01); *C08J 9/0038* (2013.01); *C08J 9/141* (2013.01); *C08J 9/142* (2013.01); *C08J 9/144* (2013.01); *C08L 75/04* (2013.01); *C08G 2110/0025* (2021.01); *C08J 2203/12* (2013.01); *C08J 2203/14* (2013.01); *C08J 2203/142* (2013.01); *C08J 2207/04* (2013.01); *C08J 2375/04* (2013.01)

(58) Field of Classification Search

CPC ....... B29B 7/74; B29B 7/7404; B29B 7/7428; B65D 83/28; B65D 83/68; B65D 83/682; C08G 18/4804; C08G 18/7671; C08G 2110/0025; C08J 9/0038; C08J 9/141; C08J 9/142; C08J 9/144; C08J 2203/12; C08J 2203/14; C08J 2203/142; C08J 2207/04; C08J 2375/04; C08L 75/04

See application file for complete search history.

(56) References Cited

U.S. PATENT DOCUMENTS

| | | | | |
|---|---|---|---|---|
| 6,333,365 | B1 * | 12/2001 | Lucas | C09K 3/30<br>521/64 |
| 2014/0275303 | A1 * | 9/2014 | Yeates | C08J 9/12<br>521/99 |
| 2018/0079881 | A1 * | 3/2018 | Zhang | C08G 18/163 |

* cited by examiner

*Primary Examiner* — John M Cooney

(74) *Attorney, Agent, or Firm* — Maginot, Moore & Beck, LLP

(57) ABSTRACT

An aerosol can configuration includes an outer can, an inner container and a spray head with a discharge element. The spray head has an outlet valve connected to the interior of the outer can and an outlet valve connected to the interior of the inner container. The two outlet valves are opened jointly by pressing on the spray head, so that the contents of the outer can and the contents of the inner container jointly enter the discharge element. To form a foam, the outer can contains at least 30-70% by weight isocyanate, in particular diphenylmethane 4,4'-diisocyanate, 3-15% by weight polyol with an OH number of less than 300, and 5-30% by weight liquid gas at a critical temperature of ≥+70° C. At least 5-30% by weight polyol with an OH number of more than 300, and 1-10% by weight liquid gas with a critical temperature of +70° C. are contained in the inner container.

17 Claims, 1 Drawing Sheet

AEROSOL CAN CONFIGURATION

PRIORITY CLAIM

This application is a divisional of U.S. application Ser. No. 16/268,680, filed on Feb. 6, 2019, which application claims priority to German Application No. DE 10 2018 001 221.3, filed on Feb. 16, 2018. The entire contents of the above-mentioned patent applications are incorporated herein by reference as part of the disclosure of this U.S. application.

BACKGROUND

The invention relates to an aerosol can configuration having a pressure-resistant outer can and at least one inner container, wherein at least one first component together with at least one propellant gas is accommodated in the outer can, and at least one additional component together with at least one propellant gas is accommodated in the inner container, said components during or after discharge producing (forming) a foam which has dimensional stability after curing and is waterproof.

Generic aerosol can configurations have so far been used to produce a foam consisting of at least two components. However, the previous foams have little or no suitability for producing a foam, which can be used to hydraulically seal pipes and the like.

EP 0 111 089 discloses a generic two-component aerosol can, which is provided with two independent chambers filled with different components. The first chamber is formed by the actual main can, in which the first component is accommodated, preferably in liquid form. The second chamber is formed by an inner container, in which the second component, which accelerates curing of the discharged foam, is added. This second component is preferably also liquid. Each chamber of the aerosol can is connected to a sealable outflow channel leading outward.

Such a can has the advantage that the two components are mixed together only after being discharged from the aerosol can and/or the inner container, so that the can may be used several times at intervals.

To produce a foam, which will have dimensional stability and will be fundamentally waterproof after curing, a prepolymer formed from the reaction of isocyanate, usually diphenylmethane-4,4'-diisocyanate and polyol, is added to the outer can. In addition, flame retardants, additives and liquefied propellant gases, for example, propane-butane 4.2 (PB4.2) and dimethyl ether (DME), are also present in the formulation. The inner container usually holds a curing agent that initiates and/or accelerates the curing of the main component, the prepolymer, together with a liquefied propellant gas, such that the curing agent and/or catalyst is preferably also present in liquefied form.

Although a foam produced using a generic aerosol can configuration is suitable for various fields of application, it has not yet been possible to produce a foam that makes it possible to fill a hollow body such as a pipe with this foam on the outside of the pipe, so that a reliable hydraulic seal is achieved. Although foams have been produced with the aerosol can configurations known in the past, which mainly have closed pores and therefore were waterproof per se, it has previously been impossible to fill large water pipes having an inside diameter of more than 100 mm, in particular more than 150 mm with such a foam, and seal the pipe, so that it will be stable for a long time.

It has been found in tests that the foam produced with a traditional aerosol can configuration, which usually/cures by trimerization, does not permit reliable sealing of hollow bodies, in particular pipes having an inside diameter of more than 100 mm. A porous layer, through which the water can penetrate, is formed at the interface of the foam with the inside wall of the pipe. The reason for this lies in the curing mechanism. When a prepolymer is cured by trimerization, it requires a starting temperature of 80° C. This temperature is easily achieved in the interior of the foam, but trimerization is terminated on the cold wall of the pipe, the and therefore a porous interface develops there. In practice, it has been found that the foam present there is not suitable for sealing pipes.

One object of the present invention is to propose an aerosol can configuration, such that when it is applied as a filler, it forms a foam suitable for sealing hollow bodies, in particular pipes having an inside diameter of more than 100 mm, wherein the foam should be watertight after curing and should be able to withstand a hydraulic pressure of at least 0.1 bar.

The basic prerequisite of producing a waterproof foam by means of which pipes can be sealed reliably, so they will be stable for a long time and can also withstand a hydraulic pressure of 0.1 bar, is created by the aerosol can configuration containing in the outer can at least 30% to 70% by weight isocyanate, in particular diphenylmethane-4,4'-diisocyanate, 5% to 30% by weight liquid gas with a critical temperature of ≥+70° C. and in an inner container at least 5% to 30% by weight polyol with an OH value of greater than 300, and 1% to 10% by weight liquid gas with a critical temperature of ≥+70° C. The aerosol can configuration concept here refers to the aerosol can together with the active ingredients contained therein.

Thus, in a preferred refinement, it is provided that, in addition, 3% to 15% by weight polyol with an OH value of less than 300 is accommodated in the outer can. This active ingredient facilitates the dimensional stability and long-term stability of the finished foam.

In another preferred refinement, it is provided that 10% to 20% by weight flame retardant is additionally accommodated in the outer can, and 0.5% to 3% by weight catalyst for the urethane reaction and 0.5% to 3% by weight trimerization catalyst are additionally accommodated in the inner can. Accommodation of these components is associated with the advantage that the foam achieves the building classification B2 "normally flame retardant" and curing proceeds more rapidly due to the catalysts.

According to a particularly preferred refinement, tris(1-chloro-2-propyl) phosphate is accommodated as a flame retardant in the outer can. This conventional commercial flame retardant is inexpensive.

In addition, 0.1% to 1% by weight catalyst for the prepolymer reaction (PPR) is preferably provided in the outer can. This yields the advantage that the PPR is completed after one day. The inexpensive, commercially available 2,2'-dimorpholinodiethyl ether is preferably present as the catalyst in the outer can.

In addition, 0.1% to 3% by weight coloring agent is preferably present in the inner can. This has the advantage that the user can monitor the mixture visually when spraying the foam.

The liquid gas in the outer can is especially preferably 5% to 30% by weight R152a, a propane-butane mixture and/or DME. Such a liquid gas has the effect that the components are expelled from the chambers of the can and a foam is formed.

Polyether-polydimethylsiloxane copolymer is preferably included as a foam stabilizer in the outer can, which offers the advantage that the foam does not melt and run.

Preferably 1% to 10% by weight R152a and/or DME and/or propane-butane mixture is/are included as the liquid gas in the inner container. These gases cause the active ingredients to be discharged and a foam to be formed.

Since the inner container holds at least 15 parts by weight polyol with an OH number of more than 300 per 100 parts by weight isocyanate or diphenylmethane-4,4'-diisocyanate, it is possible to achieve the result that a urethane reaction takes place and this reaction will take place even on a cold pipe wall.

A preferred refinement of the aerosol can configuration provides that the usable volume of the inner container amounts to at least 20% of the usable volume of the outer can. Therefore, mixture ratios of 5:1 can be achieved, e.g., 20 g curing agent or polyol component is present in the inner container per 100 g prepolymer in the outer can.

The inner container is especially preferably designed to be stable in shape and with respect to pressure. In addition to safety aspects, this design has the advantage that the inner container may be filled with the components to be accommodated therein even before being inserted into the outer can.

Another object of the invention is then to propose a foam barrier, which is created by means of an aerosol can configuration designed according to the present disclosure, said foam barrier being suitable for long-term stable sealing of pipes having an inside diameter of 100 millimeters or more, such that the foam barrier should be able to withstand pressures of at least 0.1 bar.

This object is achieved with a foam barrier having the features disclosed herein. The foam barrier has a thickness corresponding to at least 0.6 times the inside diameter of the pipe, in particular at least 0.8 times the inside diameter of the pipe, so it is possible to reliably produce hydraulic seals for pipes, and furthermore, the foam barrier can withstand a hydraulic pressure of at least 0.1 bar.

Thus, in a preferred refinement of the foam barrier, it is provided that the foam barrier consists mainly of a mixture of urethane and isocyanurate. This mixture has proven to be particularly suitable for a seal that has long-term stability.

Finally, in a particularly preferred refinement, it is provided that the foam barrier is formed in particular by the reaction of isocyanate and polyol and the trimerization of isocyanate, wherein the reaction is continued up to the inside wall of the pipe to be sealed. This ensures that the foam barrier also provides a reliable seal in the area of the pipe wall.

Additional advantageous embodiments and combinations of features of the invention are derived from the following detailed description and the totality of the patent claims.

DESCRIPTION OF THE FIGURES

The drawings used to illustrate one embodiment are given below, in which.

DETAILED DESCRIPTION

Figure 1:
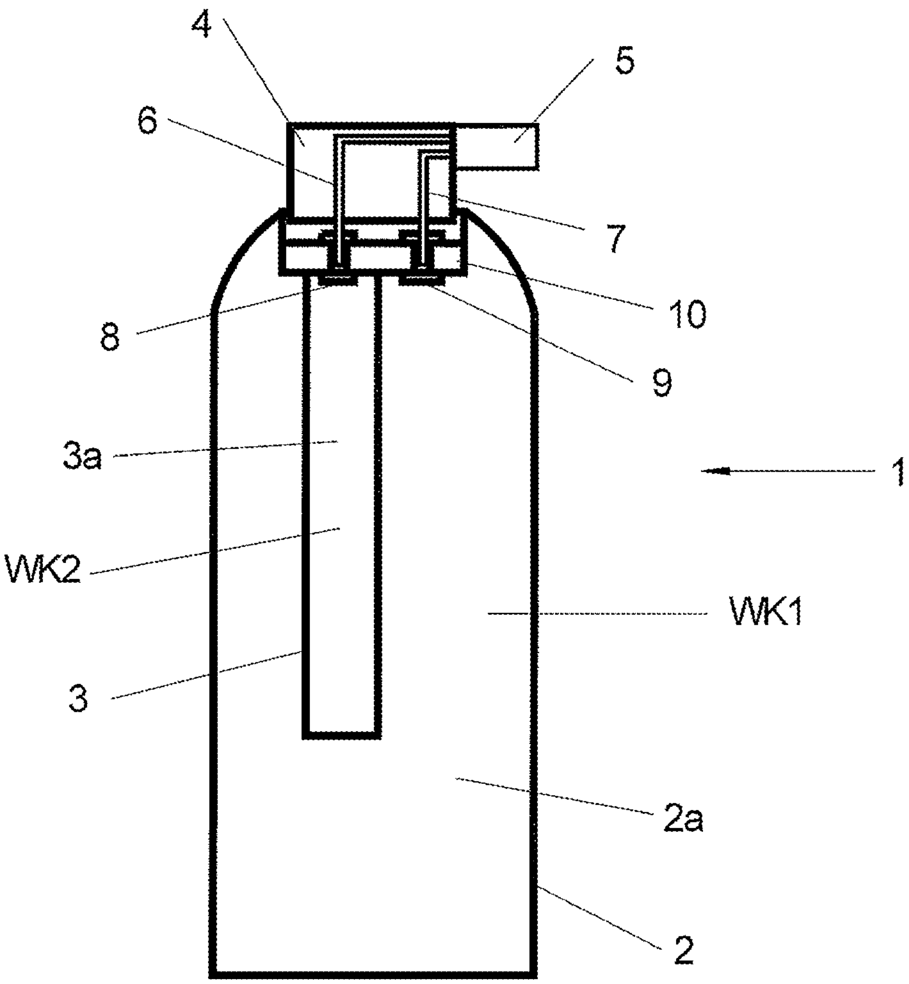
FIG. 1 shows a section through an aerosol can.

FIG. 1 shows the important components of an aerosol can in a sectional and simplified diagram. The aerosol can comprises essentially an outer can 2, which has dimensional stability and is stable under pressure, an inner container 3 and a spray head 4. In the present example, the inner container 3 is also designed as an inner can having dimensional stability and stability under pressure. The spray head 4 is connected to the inner space 3*a* of the inner container 3 by means of a first channel 6 and is connected to the inner space 2*a* of the outer can 2 by means of a second channel 7. The spray head is also provided with two outlet valves 8, 9, which close both of the aforementioned channels 6, 7 and which can be opened jointly in a known way by pressing manually on the spray head 4. The two channels 6, 7 open into a discharge element 5 arranged on the spray head 4, the components emerging from the inner container 3 and/or the outer can 2 being combined in the discharge element and mixed together with one another. The discharge element 5 may optionally have a mixing element (not shown) which is equipped with mixing channels attached to it or the discharge element 5 itself may be provided with mixing cans (not shown).

The active ingredient components accommodated in the outer can 2 are referred to as WK1 on the whole, while the active ingredient components accommodated in the inner can 3 are referred to as WK2 on the whole. The aerosol can together with the active ingredients contained therein is referred to on the whole as aerosol can configuration 1. The aerosol can configuration 1 illustrated here has the advantage that the active ingredient components WK1, WK2 contained in the two interior spaces 2*a*, 3*a* are combined only outside of the respective container, i.e., outer can 2 and/or inner container 3, and the physicochemical reaction, by means of which the foam is formed and/or generated therefore takes place outside of the two containers 2, 3. Therefore, the aerosol can and/or the aerosol can configuration 1 is/are preferably suitable for repeated use.

Depending on the application, the inner container 3 may be made of either a flexible material or a can having dimensional stability and pressure stability. The design as a can having dimensional stability and pressure stability has the advantage that it can be filled with the active ingredient components and put under pressure by means of liquid gas, for example, in the uninstalled state. For filling the inner container 3, the interior space 3*a* is first filled with active ingredients, such as the curing agent. Then the valve is screwed onto the container and the container is gassed through the valve body 8. Then the interior space 2*a* is filled with the other active ingredient, the inner container together with the valve is inserted and locked in place. The interior space 2*a* is gassed through the valve body 9. Finally, the entire can is agitated.

To form a waterproof foam, by means of which a foam barrier can be created, the following components, for example, are accommodated in the respect can. The following values are each given in percent by weight (wt %) and refer to the total filling from the outer can and the inner can.

Outer can:

- 30% to 70% diphenylmethane-4,4'-diisocyanate,
- 3% to 15% polyol with an OH number of less than 300,
- 5% to 30% liquid gas at a critical temperature of ≥+70° C., preferably R152a and/or DME,
- 10% to 20% flame retardant, preferably tris(1-chloro-2-propyl) phosphate,
- 0.1% to 1% catalyst for the prepolymer reaction, preferably 2,2'-dimorpholinodiethyl ether,
- 0.1% to 2% foam stabilizer, preferably polyether-polydimethylsiloxane copolymer.

Inner Container:

- 5% to 30% polyol with an OH number greater than 300,

1% to 10% liquid gas with a critical temperature of ≥+70° C., preferably R152a and/or DME, 0.5% to 3% catalyst for the urethane reaction, 0.5% to 3% trimerization catalyst, 0.1% to 3% coloring agent By discharging and mixing the listed components by means of aerosol can configuration 1 described above, a foam is produced, such that, after curing, it is suitable for filling even large-sized water pipes, i.e., pipes having a diameter of 100 millimeters or more, and creating a foam barrier that is waterproof and withstands a pressure of at least 0.1 bar. The foam comprised up of the active ingredient components indicated above will fully cure in approximately 5 to 10 minutes.

The mixing ratio is preferably 3 to 7 parts by weight WK1 to one part by weight WK2, wherein a mixing ratio on the order of magnitude of 5 to 1 has proven especially suitable. Due to the use of such a mixing ratio, it is possible to work with a different curing mechanism for the first time. As indicated below, curing of the prepolymer takes place through a combination of the known trimerization according to formula 1 and a urethane reaction according to formula 2:

Formula 1: Trimerization reaction.

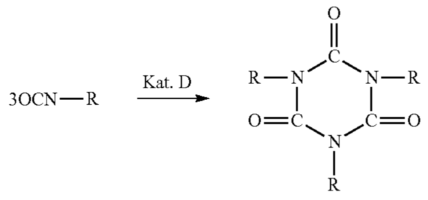

Formula 2: Urethane reaction.

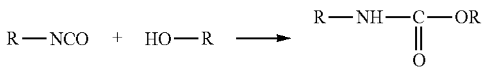

It can be seen from formula 1 that the curing takes place catalytically. It is therefore sufficient to add a small amount of catalyst from chamber 3*a* to the prepolymer and therefore it is possible to work with a mixing ratio on the order of magnitude of 10:1. However, the aforementioned mixing ratio may vary in the range between approximately 8:1 and 12:1.

For the urethane reaction according to formula 2, stoichiometrically correct amounts must be added to the prepolymer. The amount depends on the OH number of the polyol "R—OH" in formula 2. A 1:1 mixing ratio is often necessary. By developing a good formulation, it is possible to reduce this ratio to 5:1. If the flame retardant and the polyol with an OH number of less than 300 are added to the curable isocyanate, the volume is increased greatly and the mixing ratio may therefore be 5:1.

At any rate, it has been found that thorough curing of the prepolymer can be achieved by using the aerosol can configuration 1 described here. The prepolymer also cures with a consistent result radially as far as the optionally cold wall of the pipe, so that a porous interface, such as that which occurs with foams formed according to the state of the art does not develop.

Figure 2:
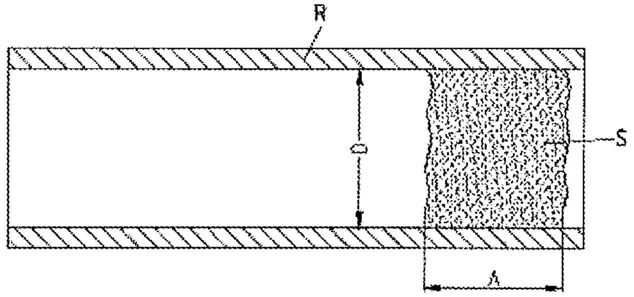
FIG. 2 shows a section through a pipe provided with a foam barrier.

FIG. 2 shows as an example a section through a pipe R provided with a foam barrier S in a simplified diagram. The foam barrier S has a thickness A corresponding to at least 0.6 times the inside diameter D of the pipe, in particular at least 0.8 times the inside diameter D of the pipe. The foam barrier S preferably has a thickness A, which corresponds at least to the inside diameter D of the pipe R. The foam barrier adheres to the inside wall of the pipe R either by adhesion or mechanical gripping along its circumference.

The foam barrier introduced into the pipe R with the aerosol can configuration described previously undergoes a curing which extends all the way to the pipe wall, so that the foam barrier is thoroughly cured and also does not form a porous interface on the pipe wall, which may be cold. The foam barrier thus forms a hydraulically continuous and dense, i.e., waterproof, seal on the pipe. Experiments have shown that at a thickness A corresponding approximately to the inside diameter D of the pipe, the foam barrier can withstand a hydraulic pressure of at least 0.1 bar. The aforementioned relationships also naturally do not apply to all pipe sizes but instead apply in particular to pipes having an inside diameter between approximately 100 mm and 500 mm. With smaller pipes, it may be sufficient in some cases to choose a thickness A, which is in the range between 0.6 times and 0.9 times the inside diameter D of the pipe R.

What is claimed is:

1. A method of creating a foam barrier in a pipe to create a hydraulic seal capable of withstanding a hydraulic pressure of at least 0.1 bar within the pipe, comprising:

spraying at least one first component from a first container and at least one additional component from a second container into the pipe to create a foam barrier, in a ratio of 3-7 parts of the at least one first component to 1 part of the at least one additional component, in which;

the first component includes 30% to 70% by weight (wt %) isocyanate and 5% to 30% by weight of a liquid gas, and the at least one additional component includes 5% to 30% by weight of a polyol and 1% to 10% by weight of a liquid gas;

wherein the foam barrier is formed by a urethane reaction of the first component with the at least one additional component, and wherein the wt % is based on the total weight of the first component and the at least one additional component.

2. The method of claim 1, wherein:

the liquid gas is a liquid gas having a critical temperature of ≥+70° C., and the polyol is a polyol with OH number of more than 300 having a critical a temperature of ≥+70° C.

3. The method of claim 1, wherein the isocyanate is diphenylmethane 4,4'-diisocyanate.

4. The method of claim 1, wherein the at least one component further includes:

a flame retardant; and a catalyst for the urethane reaction of the isocyanate and the polyol.

5. The method of claim 4, wherein the at least one first component includes:

10% to 20% by weight flame retardant; and 0.5% to 3% by weight catalyst for the urethane reaction, and 0.5% to 3% by weight trimerization catalyst for the isocyanate.

6. The method of claim 4, wherein the flame retardant is tris(1-chloro-2-propyl) phosphate.

7. The method according to claim 1, wherein the at least one first component further includes 3% to 15% by weight polyol with an OH number of less than 300.

8. The method according to claim 1, wherein the at least one first component further includes:

0.1% to 1% by weight catalyst for a prepolymer reaction between the isocyanate and the polyol, and 0.1% to 3% by weight coloring agent.

9. The method of claim 8, wherein the catalyst for the prepolymer reaction is 2,2'-dimorpholinodiethyl ether.

10. The method according to claim 1, wherein the at least one first component further includes polyether-polydimethylsiloxane copolymer as a foam stabilizer.

11. The method according to claim 1, wherein the at least one additional component further includes 1% to 10% by weight R152a and/or DME and/or propane-butane mixtures.

12. The method according to claim 1, wherein the at least one additional component further includes at least 15 parts by weight polyol with an OH number of more than 300 per 100 parts by weight isocyanate.

13. The method according to claim 1, wherein the liquid gas of the first component is 5% to 30% by weight R152a and/or DME and/or propane-butane mixtures.

14. The method of claim 1, wherein the spraying step includes providing an aerosol can configuration including;

an outer can;

an inner container; and a spray head provided with a discharge element, the spray head having an outlet valve connected to the interior of the outer can and an outlet valve connected to the interior of the inner container, wherein the at least one first component is contained together with at least one propellant gas in the outer can, and the at least one additional component together with at least one propellant gas is contained in the inner container, wherein the outlet valves are configured to be operated jointly by pressing on the spray head such that the contents of the outer can and the contents of the inner container can jointly enter the discharge element.

15. The method of claim 1, wherein the spraying step includes creating the foam barrier with a thickness of the foam barrier along the length of the pipe corresponding to at least 0.6 times the inside diameter of the pipe.

16. The method of claim 15, wherein the spraying step includes creating the foam barrier with a thickness of the foam barrier along the length of the pipe that is at least 0.8 times the inside diameter of the pipe.

17. The method of claim 1, wherein in the step of spraying at least one first component from a first container and at least one additional component from a second container into the pipe, the components are provided in a ratio of 5 parts of the at least one first component to 1 part of the at least one additional component.

* * * * *